United States Patent [19]

Tobioka et al.

[11] Patent Number: 4,610,522
[45] Date of Patent: Sep. 9, 1986

[54] MODE CHANGE-OVER DEVICE FOR PRE-WINDING TYPE CAMERA

[75] Inventors: Takashi Tobioka; Tetuo Nishizawa; Minoru Ishiguro, all of Ohmiya; Toshio Yoshida, Ibaragi; Masanoshin Komori, Ohmiya; Seiji Asano, Ohmiya; Takeshi Yoshino, Ohmiya; Hiroshi Hara, Tokyo, all of Japan

[73] Assignee: Fuji Photo Film Co., Ltd., Japan

[21] Appl. No.: 657,689

[22] Filed: Oct. 4, 1984

[30] Foreign Application Priority Data

Oct. 4, 1983 [JP] Japan ................ 58-185700

[51] Int. Cl.⁴ .................... G03B 1/12; G03B 1/60
[52] U.S. Cl. ................ 354/173.1; 354/214; 354/217
[58] Field of Search ........... 354/171, 173.1, 173.11, 354/214, 217, 218, 215

[56] References Cited

U.S. PATENT DOCUMENTS

| | | | |
|---|---|---|---|
| 4,342,509 | 8/1982 | Wakabayashi et al. | 354/173.1 |
| 4,455,074 | 6/1984 | Wong et al. | 354/214 |
| 4,504,131 | 3/1985 | Kimura | 354/173.1 |
| 4,568,164 | 2/1986 | Sahori | 354/173.1 |

Primary Examiner—A. A. Mathews
Attorney, Agent, or Firm—Brumbaugh, Graves, Donohue & Raymond

[57] ABSTRACT

A mode change-over device for a mode change-over device for a pre-winding type camera in which, after a loading of a film patrone in the camera and before the shooting, a pre-winding of the film is conducted to fully pre-wind the film on a spool and, when the pre-winding is finished, a mode retaining member is unlocked so as to release a mode change-over member thereby operating a mode change-over switch for a shooting mode, such as to allow an unwinding of the film in a frame-by-frame fashion for each shooting exposure, while the mode change-over member is charged by an opening of a back lid of the camera, the mode change-over device comprising; a counter adapted to operate in response to winding and rewinding of the camera; a retaining member for locking the mode retaining member when the back lid has been opened erroneously or accidentally; and a counter engaging member which prevents the retaining member from locking the mode change-over member when the counter is in the initial position, whereas, when the counter is in the counting position, operates the retaining member for making the retaining member lock the mode change-over member.

3 Claims, 9 Drawing Figures

MODE CHANGE-OVER DEVICE FOR PRE-WINDING TYPE CAMERA

BACKGROUND OF THE INVENTION

1. Field of the Invention

The present invention broadly relates to a pre-winding type camera in which, after loading of a film cartridge and before the exposure, the film is once extracted fully from the film cartridge and wound on a spool and, thereafter, unwound from the spool in a frame-by-frame fashion at each time of exposure. More particularly, the invention is concerned with a change-over device for conducting change-over of the operation from the pre-winding mode to the unwinding mode (referred to as "shooting mode", hereinunder).

2. Description of Prior Art

In general, a pre-winding type camera necessitates a change-over means for conducting change-over of the operation mode from the pre-winding mode to the shooting mode. This change-over mechanism, when it is to be operated automatically, requires a suitable energy storage means. In a known pre-winding camera, the energy storage means is adapted to be charged manually. With such a camera, it is quite credible that the user forgets to charge the energy storage means so that he misses a good chance for shot. In the worst case, the user confused by the shooting failure unconsciously opens the back lid of the camera to expose the film. Such an exposed film has to be wasted.

In another known pre-winding type camera, the energy storage means is adapted to be charged by a member which is operatively connected to the back lid of the camera, such that the charging is effected automatically by the closing of the back lid. This type of camera, therefore, suffers from a disadvantage in that, if the back lid is opened erroneously while the camera is in the shooting mode, the operation mode is undesirable changed-over to the pre-winding mode when the lid is closed so that the film is automatically wound fully again on the spool, so that the frames of film which have been already exposed are used again to allow "double exposure".

DESCRIPTION OF THE INVENTION

1. Object of the Invention

It is an object of the present invention to provide a mode change-over device for a pre-winding type camera, in which the energy storage means of the change-over device is charged by a member which is operatively connected to the back lid of the camera.

Another object of the present invention is to provide a mode change-over device for a pre-winding type camera which prevents undesirable change-over of the operation mode at the time of closing of the back lid after an accident opening of the lid, except the case where the film has been fully unwound so that the user can continue the shooting without the fear of the double exposure.

2. Summary of the Invention

According to the present invention, the above and other objects can be accomplished by a mode change-over device for a pre-winding type camera in which, after a loading of a film cartridge in the camera and before the shooting, a pre-winding of the film is conducted to fully pre-wind the film on a spool and, when the pre-winding is finished, a mode retaining member is unlocked so as to release a mode change-over member thereby operating a mode change-over switch for a shooting mode, such as to allow an unwinding of the film in a frame-by-frame fashion for each shooting exposure, while the mode change-over member is charged by an opening of a back lid of the camera, the mode change-over device comprising; a counter adapted to operate in response to winding and rewinding of the camera; a retaining member for locking the mode retaining member when the back lid has been opened erroneously or accidentally; and a counter engaging member which prevents the retaining member from locking the mode change-over member when the counter is in the initial position, whereas, when the counter is in the counting position, operates the retaining member for making the retaining member lock the mode change-over member.

The above and other objects and features of the present invention will become apparent from the following descriptions of a preferred embodiment taking reference to the accompanying drawings.

DESCRIPTION OF THE PREFERRED EMBODIMENT

Referring now to the drawings, there is shown a mode change-over device for pre-winding type camera in which, when a film cartridge is loaded in a cartridge chamber in the camera, the pulled out leading end of the film is automatically fed to a spool in the camera thus starting the pre-winding of the film. This camera is basically composed of a film driving system for effecting the winding and unwinding of the film, a frame feed system for unwinding the film in a frame-by-frame fashion, a counter system adapted to count the number of frames, a mode change-over switch section for effecting a change-over of the operation mode from the pre-winding mode to the shooting mode, and an electric control circuit for controlling operation of these systems. (Film Driving System)

Figure 1:
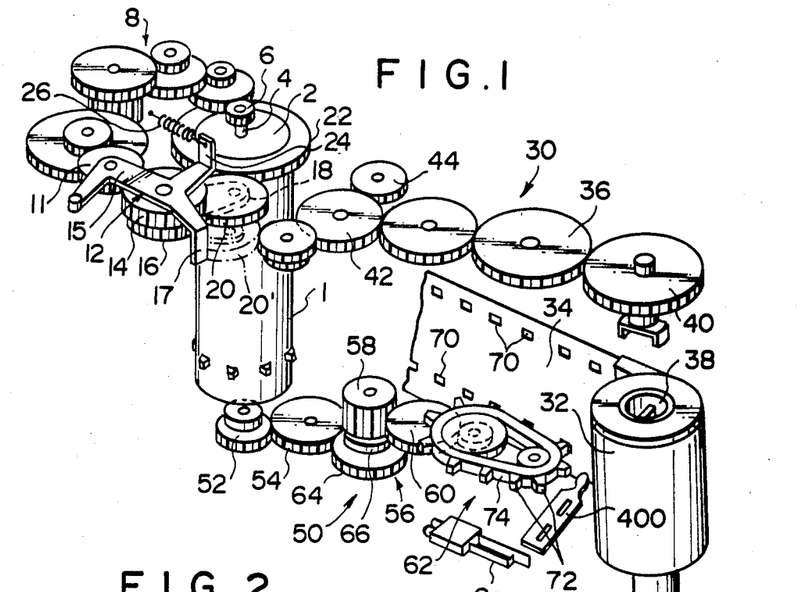
FIG. 1 is a perspective view of a film driving system in a camera incorporating a mode change-over device embodying the present invention.

FIG. 1 shows the film driving system in pre-winding mode. The film driving system has a driving motor 2 housed by a spool 1, an output gear 6 attached to the output shaft 4 of the driving motor 2, and a reduction grea train 8 engaging the output gear 6. The film driving system further includes a torque sensing lever 12 and an arm member 18 coaxially held by a first sun gear 14 and a second sun gear 16 which are formed integrally with each other. The torque sensing lever 12 has a first arm portion 15 which supports a first planet gear 11 meshing with a first sun gear 14, a biasing arm portion 24 engaging with a coiled spring 26 and adapted to bias the torque sensing lever 12 counter-clockwisely as viewed in FIG. 1, and an operation arm 17 which engages with a later-mentioned mode retaining lever 312. The arm member 18 supports a second planet gear 20 which in turn engages with a driving gear 22 on the spool 1 in the pre-winding mode as shown in FIg. 1.

In operation, the output shaft of the motor 2 is rotated counter-clockwise as viewed in FIG. 1 so that the pre-winding of the film 34 is conducted by the spool 1. When the film 34 has been fully extracted from the film cartridge 32, a tension is applied to the film 34 because the tail end of the film is anchored in he film cartridge, so that the spool 1 is prevented by the film 34 from rotating. Consequently, the sun gears 14 and 16 are stopped and the first planet gear 11 is moved clockwise as viewed in FIG. 1. As a result, the torque sensing lever 12 is rotated in the same direction so that the second planet gear 20 is disengaged from the driving gear 22 on the spool and moved to a position indicated by an imaginary line 20' in FIG. 1.

Then, as the shooting mode is commenced by the operation of the electric control circuit, the driving motor 2 is driven in the direction opposite to that in the pre-winding mode. The film unwinding mechanism which operates in the shooting mode is adapted to transmit the power of the reduction gear train 8 to a transmission gear train 30 through the first planet gear 11, first and second sun gears 14, 16 and the gear 20 which is in the position indicated by the imaginary line 20'. The final gear 36 of the tranmission gear train 30 is in engagement with a film cartridge driving gear 40 adapted for driving a take-up shaft 38 of the film cartridge 38. Another gear 42 in the transmission gear train 30 engages with a counter driving gear 44 for driving the film counter system.

Below the spool 1 and the film 34, disposed is a film feeding device 50 for feeding the leading end of the film 34 in the initial period of the pre-winding mode. The film feeding device 50 is constituted by a gear 52 provided on the lower end portion of the spool 1, an idle gear 54 meshing with the rear 52, a one-way gear device 56 engaging with the idle gear 54, an idle gear 60 meshing with the output gear 58 of the one-way gear device 56, and a driving belt device 62 adapted to be driven by the idle gear 60. The driving belt device 62 has a belt 74 of which a portion is made to run parallely to the film 34 with projections 72 formed thereon held in engagement with the perforation 70 in the film 34. The one-way gear device 56 is composed of an input gear 64, the aforementioned output gear 58, and a one-way clutch 66 through which these gears 56 and 58 are connected to each other.

As the film cartridge 32 is loaded in the camera to commence the pre-winding mode, the driving motor 2 is started to drive the spool 1 to which the leading end of the film 34 is delivered by the driving belt device 62. When the leading end of the film 34 has reached the spool 1, a suitable means (not shown) operates to allow the spool 1 to catch the leading end of the film 34 so that the film 34 can be continuously wound on the spool 1 without being restricted by the driving belt device 62.

(Frame Feed System)

Figure 2:
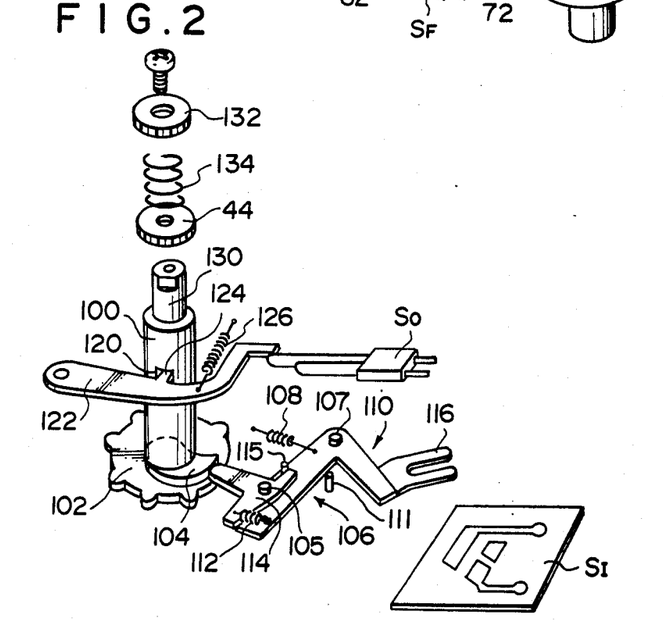
FIG. 2 is a perspective view of a frame feed system of the camera.

The frame driving system is intended for the winding of the film from the spool in a frame-by-frame fashion for successive exposures. This system has the following additional roles. Namely, this effects an initial feed of the film before the first exposure so that the first exposed frame is sufficiently spaced from the film end in the film cartridge, in order to avoid undesirable cutting of the exposed frame when the film extracted from the film cartridge is severed in a laboratory. Another additional role of this system is to deliver a signal representing the number of the frame to the counter system.

As shown in FIG. 2, the frame feed device has a sprocket shaft 100 carried by a camera body (not shown) and a sprocket 102 fixed to the lower end of the sprocket shaft 100. The sprocket 102 engages with the perforation formed in the film so that the sprocket shaft 100 is rotated following up the running of the film.

An initial feed switch $S_1$ is adapted to be actuated by a cam member 104 fixed to the upper surface of the sprocket 102, and a rocker arm device 106 engaging with the cam member 104. The rocker arm device 106 includes a first rocker member 110, a second rocker member 114 and a switch connecting member 116. The first rocker member 110 is supported by a pin 107 and is rotationally biased clockwise as viewed in FIG. 2 by a coiled spring 108 so as to be stopped by a stopper pin 111. The second rocker member 114 is supported by a pin 105 on one arm of the first rocker member 110 and rotationally biased counter-clockwise as viewed in FIG. 2 by a coiled spring 112 with respect to the first rocker member 110 so as to be stopped by a stopper pin 115. The switch connecting member 116 is fixed to the other arm of the first rocker member 110. Whn the first rocker member 110 is not rocked by the cam member 104, the rocker arm device 106 is biased by the coiled spring 108 and the stopper pin 111 such that the switch connecting member 116 is positioned above the initial feed switch $S_1$ to turn this switch on.

When the camera is still int he pre-winding mode in which the sprocket 102 rotates in the counter-clockwise direction, the second rocker member 114 only rocks about the pin 105 on the first rocker member 114 in spite of the counter-clockwise rotation of the cam member 104 but does not cause rocking motion of the first rocker member 110 so that the switch connecting member 116 holds the initial feed switch in the ON position.

On the other hand, in the molding mode of the camera operation, when the second rocker member 14 rocks as it is driven by the cam member 104, the clockwise rotation of the cam member 104 as viewed in FIG. 2 brings the second rocker member 114 into engagement with the stopper pin 115 thereby substantially fixing the second rocker member 114 to the first rocker member 110. In consequence, a subsequent clockwise rotation of the cam member 104 causes the first rocker member 110 to rock counter-clockwise as viewed in FIG. 2, through the action of the second rocker member 114. As a result, just before the one-frame switch $S_0$ is turned off, the switch connecting member 116 is moved away from the initial charge switch $S_1$ to turn this switch off. More specifically, assuming here that the second rocker member 114 has rocked clockwise as viewed in FIG. 2 by the operation of the cam member 104 i.e., if the second rocker member 114 is retained by the cam member 104 but only by the stopper pin 115, when the pre-winding mode operation has been completed, the initial clockwise rotation of the cam member 104 as viewed in FIG. 2 in the initial period of the shooting mode merely rocks the second rocker member by the action of the coiled spring 112 until it comes into engagement with the stopper pin 115, so that the first rocker member 110 does not rock and the initial charge switch $S_1$ is held in on state.

The initial feed switch $S_1$ is turned off only after the clockwise rotation of the first rocker member 110 as viewed in FIG. 2 which is effected through the second rocker member 114 only after a substantial one full rotation of the cam member 104. Therefore, the initial feed switch $S_1$ is turned off only after rotation of the sprocket 102 in excess of one full rotation, more strictly, by an angle which is the sum of the angle for effecting rocking of the second rocker member 114 and the angle of about 300° which is required for rocking of the first rocker member 110, i.e., after a unwinding of the film over a length substantially corresponding to one frame of the film.

On the other hand, when the second rocker member 114 has not been rocked by the cam member 104, a clockwise rotation of the cam member 104 as viewed in FIG. 2 causes a counter-clockwise rotation of the first rocker arm 110 as viewed in FIG. 2, that the switch connecting member 116 is moved apart from the initial feed switch $S_1$ to turn this switch off immediately before the turning off of the first one-frame switch $S_0$.

The mechanism for operating the one-frame switch $S_0$ includes an operation arm 122 which is biased counter-clockwise as viewed in FIG. 2 by the coiled spring 126, and a recess 120 formed in the sprocket shaft 100 so as to engage a projection 124 formed on an intermediate portion of the operation arm 122. The one-frame switch $S_0$ is disengaged from the operation arm 122 such as to be turned off when the projection 124 has dropped into the recess 120. However, when the projection 124 is held in contact with the outer peripheral surface of the sprocket shaft 100 other than the recess 120, the operatin arm 122 holds the one-frame switch $S_0$ in the on state. Consequently, the one-frame switch $S_0$ is turned off each time the sprocket 100 makes one full rotation, i.e., after each feed of film by a distance corresponding to one frame.

According to the described mechanisms for operating the initial feed switch $S_1$ and the one-frame switch $S_0$, the timing of turning off of the initial feed switch $S_1$ substantially coincides with the timing of turning off of the one-frame switch $S_0$ in the shooting mode of operation in which the film is unwound, but an adjustment is made such that the timing of turning off of the one-frame switch $S_0$ slightly lags behind the timing of turning off of the initial feed switch $S_1$. Therefore, in the described embodiment in which the initial feed switch $S_1$ and the one-frame switch $S_0$ are connected electrically in parallel with each other, the time duration of off state of the parallel connection always coincides with the time duration of off state of the one-frame switch $S_0$.

Therefore, if the second rocker member 114 has been rocked by the cam member 104 at the moment of completion of the pre-winding mode, the initial turning off of the one-frame switch $S_0$ is invalidated by the fact that the initial feed switch $S_1$ is held in the on state, so that the film can be unwound by a length corresponding "one frame plus α", as a result of operation of the electric control circuit which will be explained later. However, when the second rockermember 104 has not been rocked by the cam member 104 at the moment of completion of the pre-winding mode, the film is unwound by a length substantially corresponding to one frame because in this case the initial feed switch $S_1$ is turned off immediately before the first turning off of the one-frame switch $S_0$.

The frame number outputting mechanisms of the frame feed systems includes the film counter driving gear shown in FIG. 1, carried by a reduced-diameter upper end portion 130 of the sprocket shaft 100, and a counter gear 132 fixed to the upper extemity of the reduced-diameter portion 130. The film counter driving gear 44 and the counter gear 132 in combination constitute a friction clutch together with a spring 134 interposed between these gears 44 and 132. The film counter driving gear 44 transmits the power for driving the sprocket shaft 100.

(Counter System)

Figure 3:
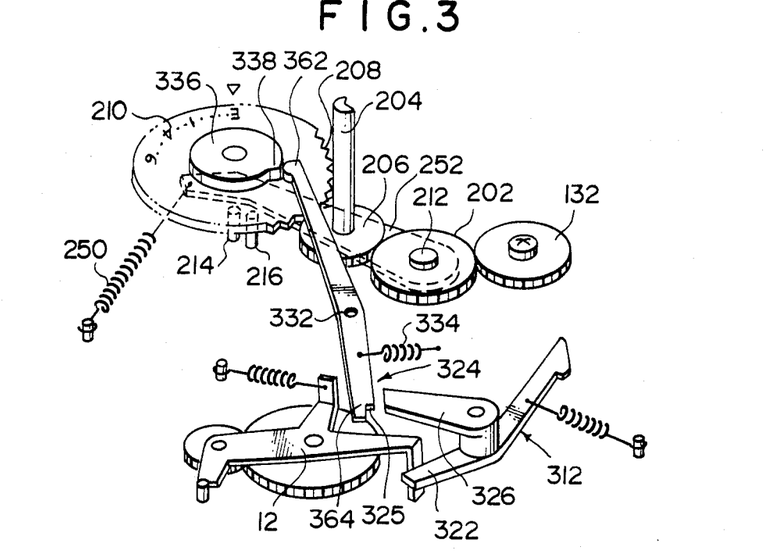
FIG. 3 is a perspective view of a counter system of the counter system.

Referring to FIG. 3, the counter system is constituted by the following parts: the counter gear 132 shown in FIG. 2, an idle gear 202 rotatably carried by a pin 212 and meshing with a counter gear 132; a single-tooth rotary member 204 made of a resilient material; a counter feed gear 206 integral with the single-tooth rotary member 204 and meshing with the idle gear 202; and a counter plate 210 provided on the outer periphery thereof with a gear 208 adapted for engagement with the single-tooth rotary member 204.

The counter feed gear 206 is supported by a rocker member 252 which in turn is supported by the pin 212 mentioned above and rotationally biased by a tension spring 250 counter-clockwise as viewed in FIG. 3. The meshing between the single-toothed rotary member 204 and the gear 208 is effected by the biasing force exerted by the tension spring 250.

A pin 214 is formed on the lower face of the counter plate 210 to project therefrom, while a cooperating stopper pin 216 is formed on the camera body (not shown). The position of a mark E, representing the "empty state of film", is determined by the mutual engagement between the pin 214 and the stopper pin 216. Although in some cameras a mark "S" is used to represent the emptiness of the film, the mark E will be exemplarily mentioned hereinunder.

The content of display on the counter is changed in a one-by-one fashion in response to each frame feed of the film, in either of the pre-winding mode and the shooting mode. After the presentation of the E mark on the counter display, i.e., after full unwinding of the film in the shooting mode, a further clockwise rotation of the counter feed gear 206 as viewed in FIG. 3 causes the rocker member 252 to be rotated clockwise overcoming the force of the tension spring because in this case the gear 208 of the counter plate 210 cannot rotate any more. Consequently, the single-toothed rotary member 204 idles.

(Mode Change-Over Switch Section)

Figure 4:
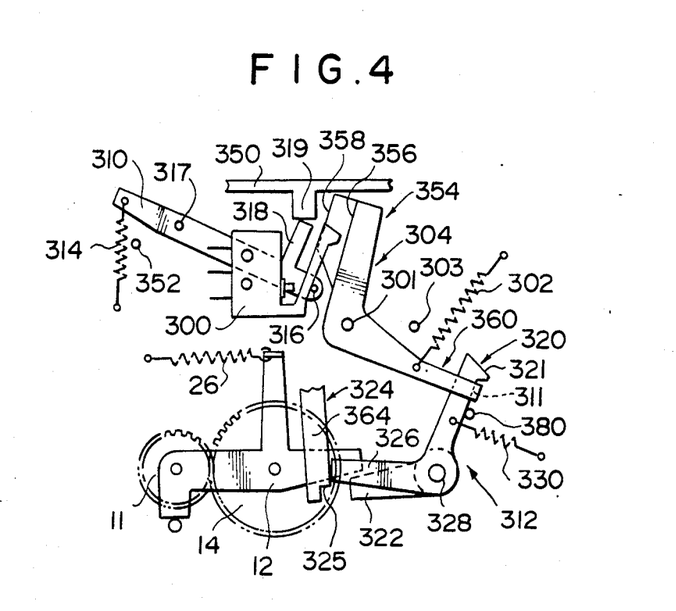
FIG. 4 is a perspective view of a mode change-over switch section of the camera.
Figure 5:
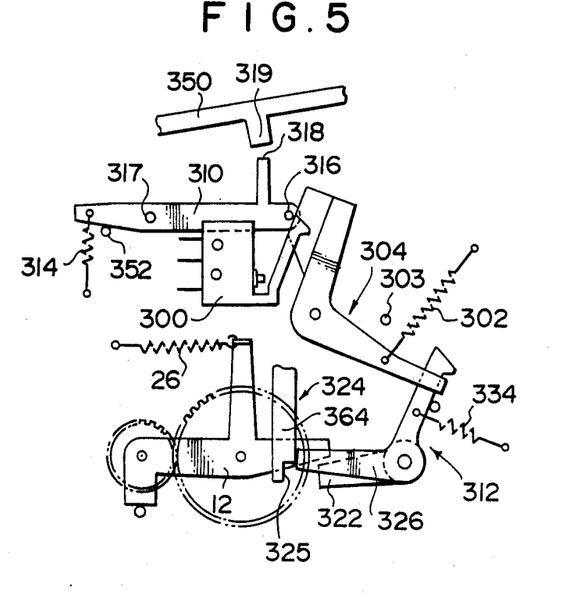
FIGS. 5 to 8 are illustrations of operation of the mode change-over switch.
Figure 6:
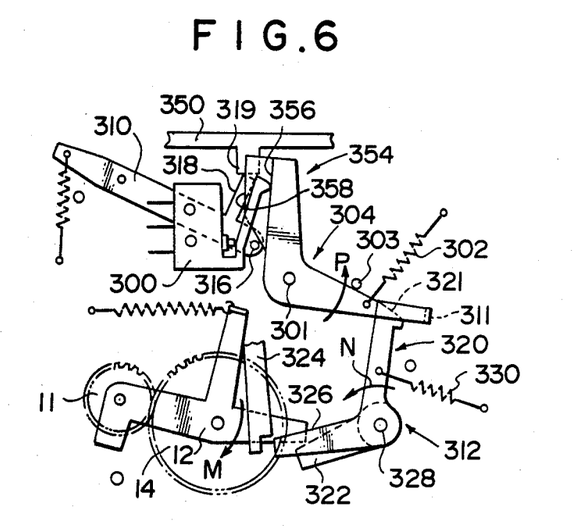
Figure 7:
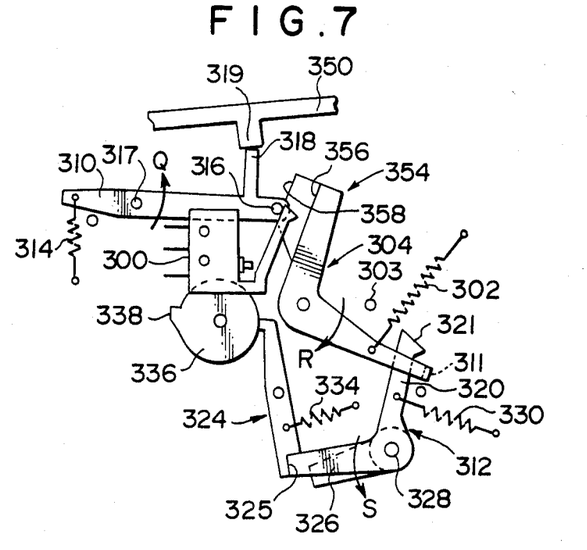
Figure 8:
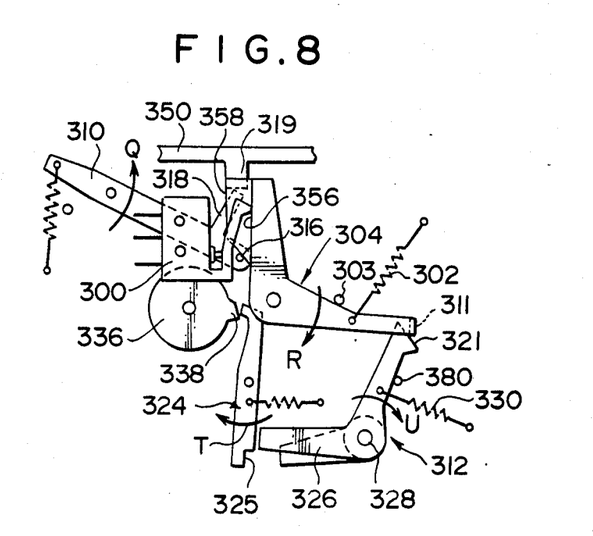

FIGS. 4 to 8 in combination illustrate the operation of the mode change-over switch section. More specifically, FIG. 4 shows the mode change-over switch section while the camera is in the pre-winding mode with its back lid closed, FIG. 5 shows the same section while the camera is in the pre-winding mode with its back lid opened. Similarly, FIGS. 6 and 7 show the mode change-over switch section in the shooting mode, with the back lid closed and opened, respectively, while FIG. 8 shows this section in the state in which the counter displays the E mark after full unwinding of the film, i.e., after the finish of exposure with this film.

As shown in FIG. 4, the mode change-over switch section is constituted by the following parts: a mode change-over switch 300 which is adapted to switch a later-mentioned electric circuit between the pre-winding mode and the shooting mode; a charge lever 310 adapted to operate in response to opening or closing movement of the back lid 350 of the camera; a mode change-over lever 304 adapted to effect the switching of the mode change-over switch 300; a mode retaining lever 312 adapted to retain, at a suitable timing, the mode change-over lever 304 in the position for rocking in the pre-winding mode; and a rtainer lever 324 adapted to lock the mode retaining lever 312 upon detection of an erroneous opening of the back lid.

The charger lever 310 is supported by a pin 317 and is biased counter-clockwise as viewed in FIG. 4 by the force of the spring 314. A projection 318 engageable with a projection 319 on the back lid 350 is provided on an intermediate portion of the charge lever 310, while a pin 316 engageable with the mode change-over lever 304 is provided on the extreme end of the charge lever 310.

A counter-clockwise rotation of the charge lever 310 by the spring 314 is limited by the stopper pin 352.

The mode change-over lever 304 is supported by a pin 310 and is biased counter-clockwise as viewed in FIG. 4 by a spring 302. This lever 304 has two arm portions: namely, an arm portion 354 having a flat portion 356 engaging the mode change-over switch 300 and a projection 358 engaging the pin 316 on the charge lever 310, and the other arm portion 360 which is provided at its extremity with a downward projection engaging the mode retaining lever 312.

The mode retaining lever 312 is supported by a pin 328 and is biased clockwise as viewed in FIG. 4 by a spring 330, but this clockwise rotation is stopped by a stopper pin 380. The mode retaining lever 312 has three lever portions: namely, a first lever portion 30 provided with a projection 321 engaging the downward projection 311 of the mode change-over lever 304, a second lever portion 322 engaging the torque sensing lever 12 of the film driving system explained before, and a third lever portion 326 engaging the retaining lever 324.

As will be seen from FIG. 3, the retaining lever 324 is supported by a pin 332 and is biased counter-clockwise as viewed in FIG. 3 by the force of the spring 334. The retaining lever 324 has two arm portions: namely, an arm portion 326 which contacts a counter cam plate 336 fixed to the counter plate 210, and the other arm portion 364 provided with a notch 325 adapted to be engaged by the third lever portion 326 of the mode retaining lever 312. The counter cam plate 336 has a projection 338 which acts to rotate the retaining lever 324 clockwise as viewed in FIG. 3 only when the mark E is presented on the counter.

As will be seen from FIG. 4, when the user mounts the film cartridge in the camera, the mode change-over lever 304 has been retained by the mode retaining lever 312 in the pre-winding mode position where it does not engage with the mode change-over switch 300, so that the mode change-over switch 300 is connected for the pre-winding mode. Therefore, the operation in the pre-winding mode is started to commence the pre-winding, as the back lid 350 is closed after the mounting of the film cartridge.

Referring to FIG. 5, when the back lid 350 is opened erroneously while the camera is in the pre-winding mode, the charge lever 310 is released from the back lid 350 and is rotated by the force of the spring 314 unitl it is stopped by the stopper pin 352. On the other hand, since the mode change-over lever 304 is held by the mode retaining lever 312 in the pre-winding mode position where it can clear the pin 316 of the charge lever 310, the mode change-over switch 300 maintains the connection for the unwinding mode operation. Then, as the back lid 350 is closed, the charge lever 310 is returned to the position shown in FIG. 4, and the unwinding operation is commenced again because the mode change-over switch 300 maintains the connection of the unwinding mode. operation.

After the completion of the unwinding, the troque sensing lever 12, as shown in FIG. 6, is rotated in the direction of an arrow M by the first planet gear 11 such as to press the second lever portion 322. This in turn causes a rotation of the mode retaining lever 312 in the direction of an arrow N so that the projection 321 on the first lever portion 320 is disengaged from the lower projection 311 of the mode change-over lever 304. In consequence, the mode change-over lever 304 is rotated by the force of the spring 302 in the direction of an arrow P, and is stopped by the stopper pin 303 to take the shooting mode position as shown in FIG. 6. Meanwhile, the flat portion 356 of the mode change-over lever 304 presses the mode change-over siwitch 300 to operate this switch such as to make a connection for the shooting mode operation, thus starting the shooting mode operation of the camera.

In the event that the back lid 350 is opened while the camera is in the shooting mode, as shown in FIG. 7, the charge lever 310 is rotated in the direction of an arrow Q by the force of the spring 314, following up the opening movement of the back lid 350. In consequence, the pin 316 of the charge lever 310 engages the projection 353 on the mode change-over lever 304 to rotate the latter in the direction of an arrow R to the pre-winding mode position. On the other hand, the counter presents a counting position, i.e., a numeral or mark other than E, and the retaining lever 324 is held in contact with the cam surface of the counter cam plate 336 other than the projection 338, so that the notch 325 of the retaining lever 324 is disposed at a position where it is engageable with the third lever portion 326 of the mode retaining lever 312. Therefore, when the lower projection 311 of the mode change-over lever 304 slides past the projection 321 of the mode retaining lever 312 as a result of the rotation of the mode change-over lever 304 to the pre-winding mode position, the third lever 326 of the mode retaining lever 312 is rotated in the direction of an arrow S into engagement with the notch 325 in the retaining lever 324, so that the mode retaining lever 312 is held in the position shown in FIG. 7 where it clears the mode change-over lever 304.

Then, as the back lid 350 is closed again, the projection 318 on the charge lever 310 is pressed by the projection 319 on the back lid 350, so that the charge lever 310 is rotated in the direction counter to the arrow Q to the position shown in FIG. 6 where the pin 316 cannot engage with the projection 358 of the mode change-over lever 304. Consequently, the mode change-over lever 304 is rotated in the direction counter to the arrow R by the force of the spring 302, without being interferred not stopped by the mode retaining lever 312 and the charge lever 310, whereby the mode change-over switch 300 is operated to complete the connection for the shooting mode, thus recovering the shooting mode operation of the camera.

After the exposure of all portion of the film and a consequent unwinding of the film from the spool into the film cartridge, the counter displays the mark E and, as shown in FIG. 8, the projection 338 of the counter cam plate 336 acts to rotate the retaining lever 324 in the direction of an arrow T out of engagement with the mode retaining lever 312. In consequence, the mode retaining lever 312 is rotated in the direction of an arrow U by the force of the spring 330 to a position where it is engageable with the mode change-over lever 304.

Then, as the back lid 350 is opened, the charge lever 310 is rotated by the force of the spring 314 in the direction of the arrow Q following up the opening movement of the back lid 350, so that the pin 316 is brought into contact with the projection 358 on the mode change-over 304 thereby to rotate to latter in the direction of the arrow R, allowing the lower projection 311 on the mode change-over lever 304 slide past the projection 321. In consequence, the mode change-over lever 304 is retained by the mode retaining lever 312 in the pre-winding mode position as shown in FIG. 4. Consequently, the mode change-over switch 400 complete the connection for the pre-winding mode, thus preparing for the pre-winding mode operation of the camera.

(Electric Control Circuit)

Figure 9:
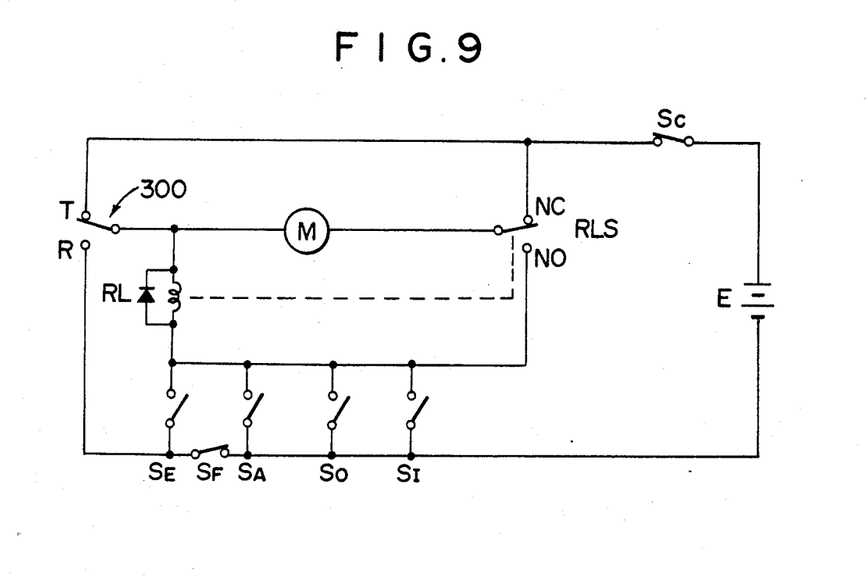
FIG. 9 is a circuit diagram of an electric control circuit incorporated in the embodiment.

Referring to FIG. 9, the electric control circuit includes a power source E, a back lid switch $S_C$ which is adapted to be turned off and on in response to the opening and closing of the back lid, a driving motor M, a relay RL, a relay switch RLS, a film detecting switch $S_F$ adapted to detect presence or absence of the film, the mode change-over switch 300, a counter switch $S_E$, a manual rewind switch $S_A$ for rewinding an erroneously exposed film, and the one-frame switch $S_0$ and the initial feed switch $S_1$ which were mentioned before. The back lid switch $S_C$, relay L, relay switch RLS, counter switch $S_E$ and the manual rewind switch $S_A$ are omitted from FIGS. 1 to 8. The counter switch $S_E$ is operatively connected to the counter plate 210 and is adapted to be held in on state only when the counter indicates a region between a position which is spaced slightly from the position "1" towards E and the position of E. As shown in FIG. 1, the film detecting switch $S_F$ is disposed in the vicinity of a passage along which the film 34 runs so as to detect the presence or absence of the film through the operation of a contact feeler 400. This switch takes the one state whenever the film 34 is on the film passage.

The operation of this electric control circuit is as follows. As the back lid is closed after the mounting of the film cartridge in ordinary manner, the mode change-over lever 34 is charged and the mode change-over switch 300 is connected to the pre-winding contact R so that the back lid switch $S_C$ is turned on. At the same time, the film detecting switch $S_F$ is turned on because it detects the presence of the film. In consequence, the electric circuit including the back lid switch $S_C$, normally closed contact NC of the relay switch RLS, driving motor M and the pre-winding mode contact R of the mode change-over switch 300 is completed to conduct the pre-winding of the film.

After the completion of the pre-winding, the rotation of the film spool 1 is stopped by the tension in the film, so that the torque sensing lever 12 is rotated clockwise as viewed in FIG. 1 to cause a counter-clockwise rotation of the mode detaining lever 312. As a result, the mode change-over lever 304 is rotated to the shooting mode position and the mode change-over switch 300 is connected to the shooting mode contact T. Meanwhile, the manual rewind switch $S_A$ and the counter switch $S_E$ are in the off state. However, since both or either one of the one-frame switch $S_0$ and the initial feed switch $S_1$ are in the on state, the relay RL is energized to close the normally opened contact NO. Consequently, the unwinding operation for the initial feed is effected as a result of completion of an electric circuit constituted by the back lid switch $S_C$, the mode change-over switch 300 connected for shooting mode, the driving motor M, the normally-opened contact of the relay switch RLS and either one or both of the one-frame feed switch $S_0$ and the initial feed switch $S_1$.

After the unwinding of the film by a predetermined length, i.e., after the initial charge of the film, the one-frame switch $S_0$ and the initial feed switch $S_1$ are turned off to stop the driving motor M, thus preparing for the first shot, i.e., for the exposure of the first frame or the film.

Then, the film is unwound in a frame-by-frame fashion each time the one-frame switch $S_0$ is turned on in response to the exposure.

In the event that the film has been undesirably exposed due to, for example, an accidental opening of the back lid in the shooting mode of the camera, the user can unwind the film at once into the film cartridge by turning the manual rewind switch $S_A$ on so as to invalidate the off state of the one-frame switch $S_0$. Consequently, the driving motor M continues to operate until the electric power supply to this motor is stopped by turning off of the film detecting switch $S_F$ upon detection of the absence of the film, so that the film is fully retracted into the film cartridge.

When the unwinding of the film after the exposure of the final frame indicated by "1" on the counter is commenced, the counter switch $S_E$ is turned on so that the off state of the one-frame switch $S_0$ is invalidated. Consequently, the unwinding is continued until the film detecting switch $S_F$ is turned off by the detection of absence of the film on the film passage.

The invention has thus been shown and described with reference to a specific embodiment, however, it should be noted that the invention is in no way limited to the details of the illustrated arrangements but changes and modification may be without departing from the scope of the appended claim.

We claim:

1. A prewinding type photographic camera capable of receiving a film cartridge in which there is provided means for extracting film from the film cartridge and winding the film on a take-up spool during a prewinding mode, means for rewinding the film from the spool to the film cartridge during a shooting mode and means for switching the mode of operation of the camera selectively between the prewind mode and the shooting mode which comprises:
    a back lid movable between an open position and a closed position;
    a charge member adapted to operate in response to opening and closing of said back lid;
    a counter adapted to operate in response to winding and rewinding of the film;
    a mode retainer member for retaining a selected mode of operation; and
    a retainer member jointly responsive to said counter and to said charge member for locking said mode retainer member when the counter is in a counting position and unlocking said mode retainer member then the counter is in an initial position;
    said switching means including a mode change over member responsive to the mode retainer member which is locked when said mode retainer member is locked by said retainer member and is unlocked when said mode retainer member is unlocked by said retainer member and a mode change over switch responsive to the mode change over member for changing the mode of operation of the camera when the mode change over member is unlocked.

2. A prewinding type photographic camera according to claim 1 wherein said spool has motor means for winding and rewinding said film from said spool and the mode change over switch is in circuit with said motor.

3. A prewinding type photographic camera according to claim 1 wherein said retaining member is a retaining lever and said counter is provided with a counter cam plate mounted on a common shaft with said counter and having a projection which acts to rotate said retaining lever.

* * * * *